US008033134B2

(12) United States Patent  (10) Patent No.: US 8,033,134 B2
Litch et al.  (45) Date of Patent: Oct. 11, 2011

(54) EXTENDED COLD (BATTERY BACKUP) REFRIGERATOR

(75) Inventors: Andrew David Litch, Saint Joseph, MI (US); Rodrigo Alexandre Sigwalt, Joinville, SC (US); Anderson Bortoletto, Saint Joseph, MI (US); Vincent Paul Anderson, Evansville, IN (US); Michael E. Stagg, Evansville, IN (US); Ronald Wayne Guess, Evansville, IN (US); Jill C. Moeller, Newburgh, IN (US); Randell L. Jeffery, Stevensville, MI (US); Matthew J. Nibbelink, Saint Joseph, MI (US)

(73) Assignee: Whirlpool Corporation, Benton Harbor, MI (US)

(*) Notice: Subject to any disclaimer, the term of this patent is extended or adjusted under 35 U.S.C. 154(b) by 424 days.

(21) Appl. No.: 11/839,641

(22) Filed: Aug. 16, 2007

(65) Prior Publication Data

US 2009/0045680 A1 Feb. 19, 2009

(51) Int. Cl.
*F25D 17/04* (2006.01)
(52) U.S. Cl. ............................ 62/408; 62/426; 62/449
(58) Field of Classification Search .................... 62/187, 62/236, 408, 246, 419, 426; 340/585; 312/116, 312/139; 454/140, 149
See application file for complete search history.

(56) References Cited

U.S. PATENT DOCUMENTS

| 2003/0010045 A1* | 1/2003 | Ferragut et al. ................ 62/129 |
| 2003/0156034 A1* | 8/2003 | Longobardi ................... 340/585 |
| 2006/0179870 A1* | 8/2006 | Byrne et al. .................... 62/408 |
| 2006/0260335 A1* | 11/2006 | Montuoro et al. .............. 62/236 |
| 2006/0260347 A1* | 11/2006 | Coulter et al. ................. 62/344 |

\* cited by examiner

*Primary Examiner* — Mohammad Ali
(74) *Attorney, Agent, or Firm* — John W. Morrison; Kirk W. Goodwin; McKee, Vorhees & Sease PLC (57) ABSTRACT

A refrigerator includes a refrigerator cabinet, a refrigerator compartment disposed within the refrigerator cabinet, a freezer compartment disposed within the refrigerator cabinet, and a battery. There is at least one fan disposed within the refrigerator cabinet and electrically connected to the battery. The battery powers the at least one fan during a power outage to thereby circulate air from the freezer compartment to the refrigerator compartment. The at least one fan may be a direct current operated fan. The refrigerator may also include an inverter and the at least one fan may then be an alternating current operated fan electrically connected to the inverter. The battery may be disposed within the refrigerator cabinet or may be external to the refrigerator cabinet.

26 Claims, 10 Drawing Sheets

EXTENDED COLD (BATTERY BACKUP) REFRIGERATOR

BACKGROUND OF THE INVENTION

The present invention relates to refrigerators, and more particularly to limiting adverse effects of power outages on the operation of refrigerators.

One of the problems with refrigerator use is the effect of power outages. When a power outage occurs, food or other items within the refrigerator may be subjected to spoilage which can be costly.

One approach to address the problems associated with power outages in refrigerators is the use of a home generator. There are a number of problems associated with the use of home generators. Another problem is that the home generators are relatively expensive to purchase. Although it may be possible to rent a generator, often times power outages affect a number of people at the same time and demand is too high for companies that rent generators to meet the demand. Another problem with generators is that when not in use, they must be stored away from flame or sparks such as in a garage or vented storage, but when in use they should be operated outside for safety reasons. The use of generators in multi-unit dwellings presents additional problems, such as permission and agreement of landlords and/or resident associations and operational logistics.

Another problem with using generators is the limited power generated. The power to run a refrigerator, minimal lighting and a computer or television set may require a generator that delivers 2,500 watts or more of power. Generator prices go up by the power required. A home generator should be installed by a licensed electrician and must never be plugged, or back fed into a standard household outlet.

An alternative approach is to install a compressor kit such as may be sold by repair shops or appliance part stores. Typically compressor kits are expensive and require significant time and effort to install.

Another alternative approach is to store cold compress and ice bags in their refrigerator when the power outage is predictable such as hurricanes, snowstorms, tornadoes. Ice bags and cold compress are less expensive than home generators and addresses the problem for perhaps a couple of hours. One of the problems with this approach is that additional space is required in the refrigerator, potentially displacing food items.

Another alternative is to use cold boxes. Consumers may use cold boxes in an attempt to reduce food spoilage. This activity consumes time and effort in moving the food from the refrigerator to the cold boxes and after the power is restored and the refrigerator is working properly, the consumers need to return the food to the refrigerator and clean the cold boxes. In addition, consumers would generally need multiple cold cases, such as four to ten cold cases, in order to have sufficient space to fit all the food from a typical refrigerator. Another drawback to this approach is that it is a temporary solution lasting perhaps a few hours.

Thus, it is apparent that the effect of power outages on refrigerators is problematic, with a number of diverse attempts at addressing the problem.

BRIEF SUMMARY OF THE INVENTION

Therefore, it is a primary object, feature, or advantage of the present invention to provide for an extended cold refrigerator which provides for cooling of the refrigeration compartment during a power outage.

According to one aspect of the present invention, a refrigerator includes a refrigerator cabinet, a refrigerator compartment disposed within the refrigerator cabinet, a freezer compartment disposed within the refrigerator cabinet, and a battery. There is at least one fan disposed within the refrigerator cabinet and electrically connected to the battery. The battery powers the at least one fan during a power outage to thereby circulate air from the freezer compartment to the refrigerator compartment. The at least one fan may be a direct current operated fan. The refrigerator may also include an inverter and the at least one fan may then be an alternating current operated fan electrically connected to the inverter. The battery may be disposed within the refrigerator cabinet or may be external to the refrigerator cabinet. The battery may be rechargeable battery, a non-rechargeable battery, fuel cell, or super capacitor.

According to another aspect of the present invention, a refrigerator includes a refrigerator cabinet, a refrigerator compartment disposed within the refrigerator cabinet, a freezer compartment disposed within the refrigerator cabinet, an ice box disposed within the refrigerator cabinet and remote from the freezer compartment, a battery, an ice box damper operatively connected to the battery for controlling air flow between the freezer compartment and the ice box, and an ice box fan proximate the icebox. The battery provides power for driving the ice box damper to a position of closed to ice box airflow and open to refrigerator compartment airflow and powering the ice box fan during a power outage to thereby circulate air from the freezer compartment to the refrigerator compartment. The icebox fan may be a direct current operated icebox fan, or the icebox fan be an alternating current operated icebox fan where an inverter is used. The battery may be disposed within the refrigerator cabinet or external to the refrigerator cabinet. The ice box damper may be a direct current damper or an alternating current damper where an inverter is used. The refrigerator may be configured as a side-by-side, top mounted freezer, or bottom-mounted freezer.

According to another aspect of the present invention, a refrigerator includes a refrigerator cabinet, a refrigerator compartment, a freezer compartment disposed within the refrigerator cabinet, a battery disposed within the refrigerator cabinet, and at least one fan disposed within the refrigerator cabinet. There is a temperature sensor for sensing temperature associated with the refrigerator compartment. There is also an intelligent control electrically connected to the battery, the temperature sensor, and each of the at least one fan. The intelligent control is programmed to (a) detect occurrence of a power outage, (b) monitor temperature associated with the refrigerator compartment using the temperature sensor, (c) control operation of the at least one fan during the power outage to circulate air from the freezer compartment to the refrigerator compartment to maintain a highest allowed temperature to prolong life of the battery and prevent food stuffs in the refrigerator from freezing. The refrigerator may also include a user interface electrically connected to the intelligent control and wherein the intelligent control being further programmed to (d) to provide information associated with the power outage to the user interface during the power outage for displaying to a user during the power outage or displaying to the user after the power outage.

According to another aspect of the present invention, a method for operating a refrigerator during a power outage to prolong cooling of a refrigeration compartment within the refrigerator is provided. The method includes providing power with a battery, detecting occurrence of the power outage by an intelligent control within the refrigerator, the intelligent control powered by the battery during the power outage, monitoring temperature associated with the refrigeration compartment, and controlling operation of at least one fan during the power outage to circulate air from a freezer compartment to the refrigeration compartment, the at least one fan powered by the battery. The method may further include operating a damper associated with an icebox of the refrigerator upon detecting the occurrence of the power outage such as by driving the damper to a position of closed to ice box airflow and open to refrigerator compartment airflow. The at least one fan may be a direct current operated fan or an alternating current operated fan where an inverter is used.

DETAILED DESCRIPTION OF THE PREFERRED EMBODIMENT

Figure 1:
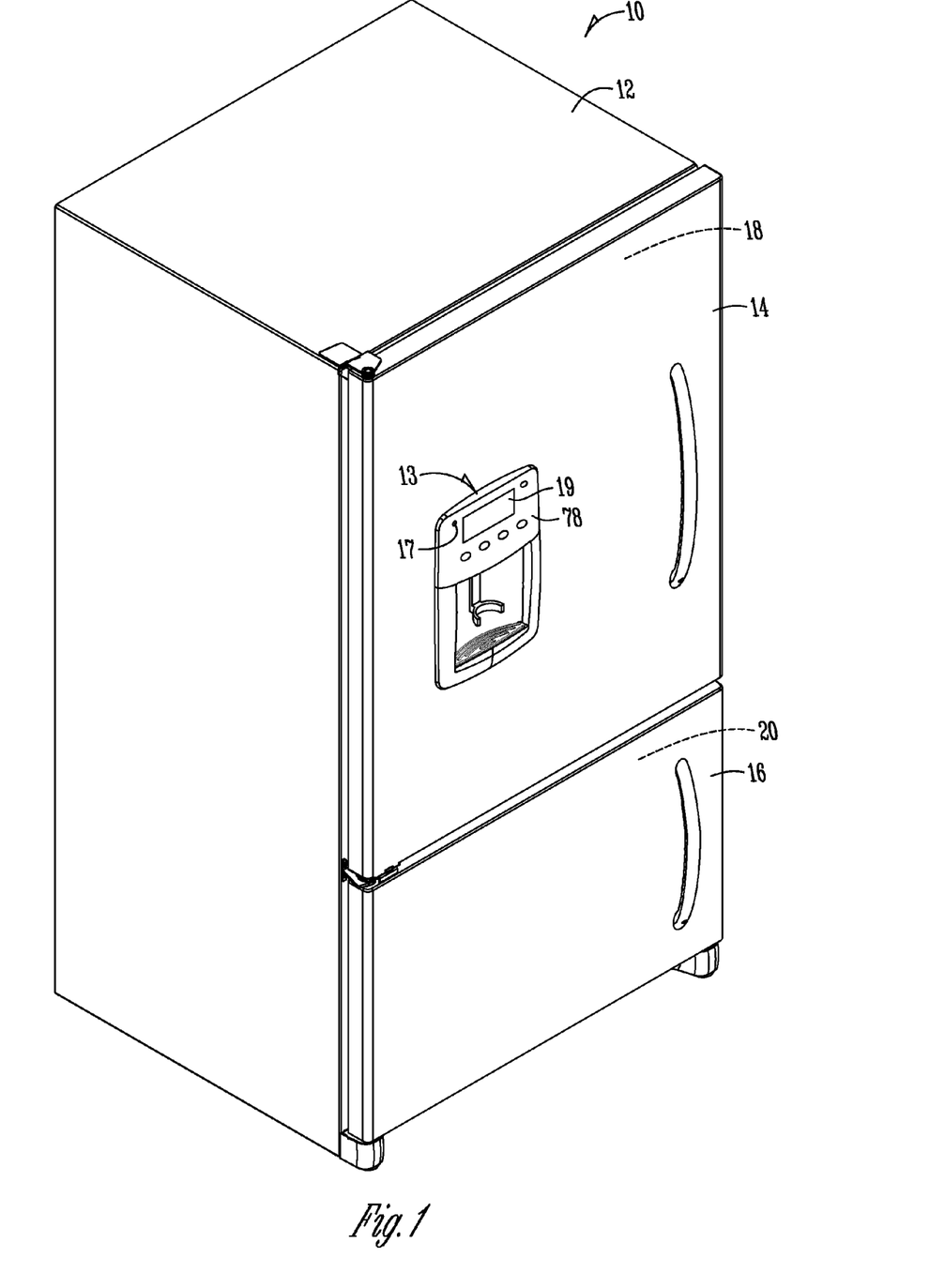
FIG. 1 is a perspective view of one embodiment of a refrigerator having a bottom mount freezer.

FIG. 1 is a perspective view of one embodiment of a refrigerator 10. The refrigerator 10 shown has a cabinet 12 with a freezer compartment 20 below a refrigeration compartment 18. A refrigerator compartment door 14 is shown for providing access to the refrigeration compartment 18. A freezer compartment door 16 is shown for providing access to the freezer compartment 20. A dispenser 13 is positioned at the refrigerator compartment door 14 for dispensing ice and water.

Figure 2:
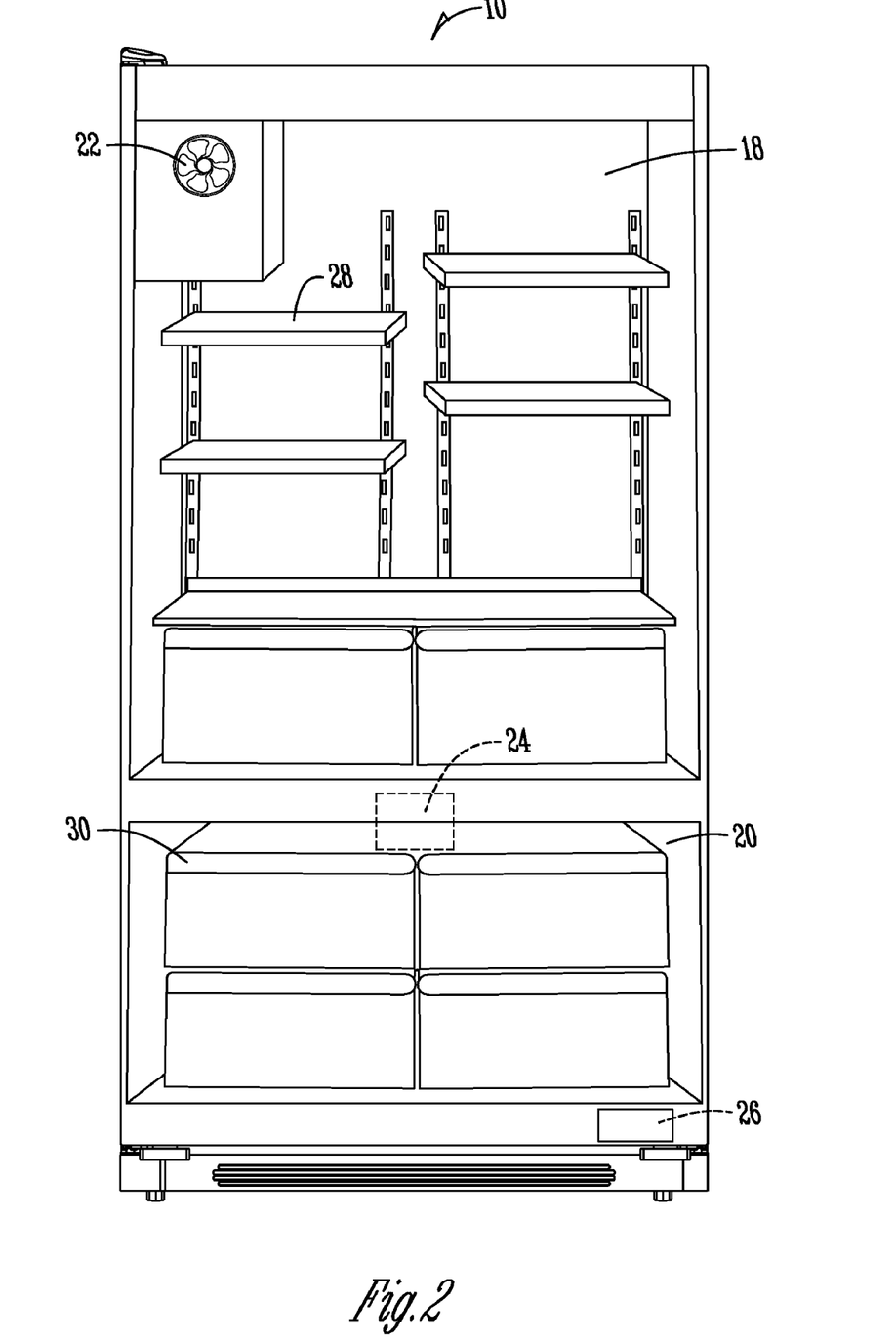
FIG. 2 is an inside view of one embodiment of the interior of a refrigerator.

FIG. 2 illustrates one embodiment of the interior of the cabinet 12. Within the refrigeration compartment is an ice box fan 22. Within the freezer compartment 20 is a bottom freezer evaporator fan 24. Shelving 28 is provided in the refrigeration compartment 18 and bins such as bin 30 are provided in the freezer compartment. The present invention contemplates any number of configurations for the cabinet and for the organization of shelving, bins, and the like. A battery 26 is also disposed within the or external to the cabinet 26. The battery 26 need not be positioned in the location shown, which is merely one convenient location. The battery 26 may be a rechargeable battery, or single use non-rechargeable battery, or fuel cell or super capacitor providing a contained power source. The battery 26 may include a single cell or multiple cells. Multiple cells allow a user the option to tailor the amount of power outage extension desired based on usage of thermal mass of refrigerator structure and contents. Thus, the battery may allow for the staging of backup power.

In the embodiment shown in FIG. 2, because the ice box is located remotely from the freezer compartment so that ice can be stored and dispensed from the dispenser 13, the ice box fan 22 is present. In some configurations of refrigerators there would not be an ice box fan present. In such a configuration, only the evaporator fan 24 would be needed.

Figure 3:
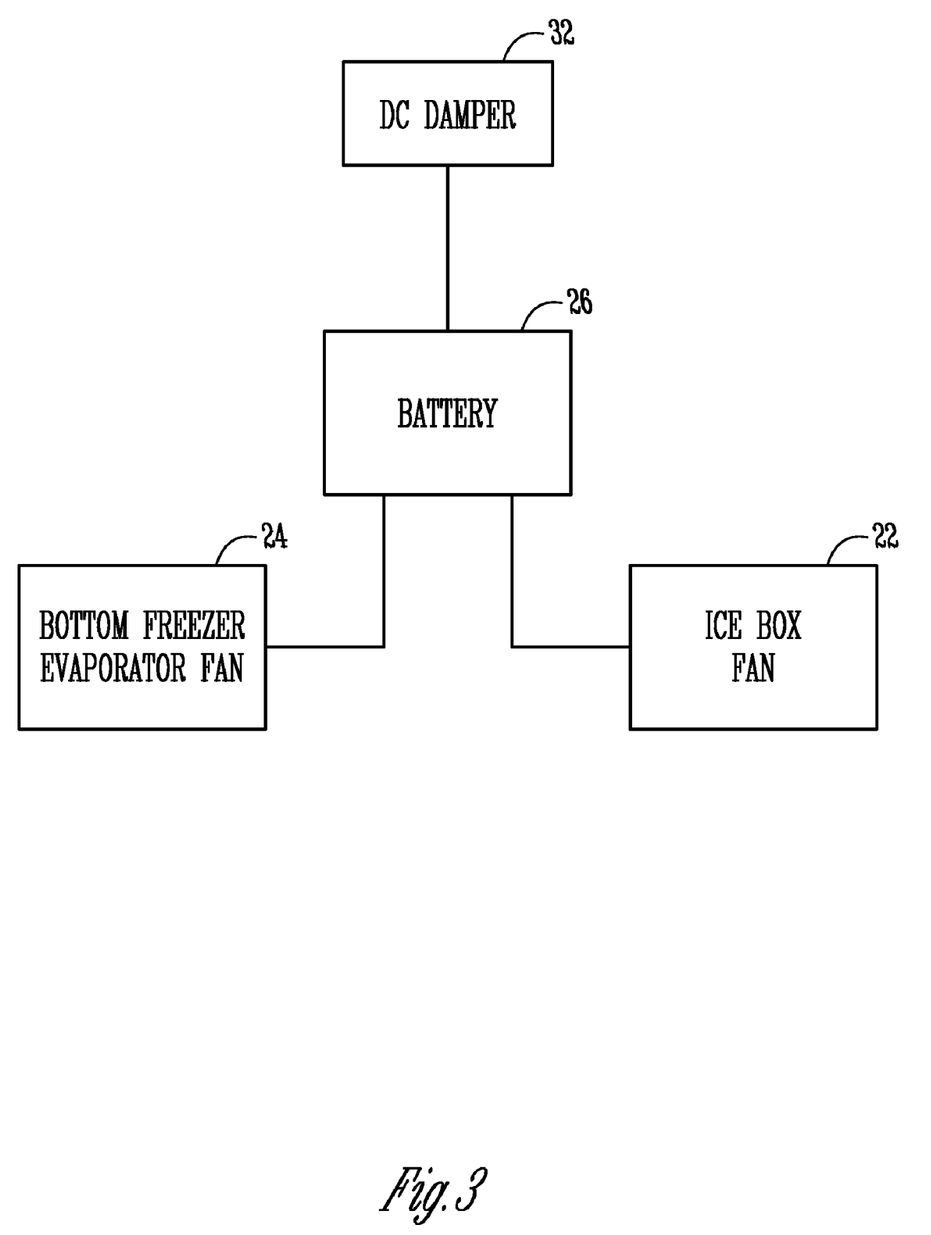
FIG. 3 is a block diagram of one embodiment of the present invention where a DC damper is powered by a battery.

FIG. 3 illustrates a block diagram according to one embodiment of the present invention. A battery 26 is shown which is electrically connected to the bottom freezer evaporator fan 24 and the ice box fan 22. The battery 26 is also electrically connected to a direct current (DC) operated damper 32. When a power outage is experienced, the battery 26 provides an energy source to operate the DC damper 32 to direct air from the freezer compartment to the refrigerator compartment to thereby maintain colder temperatures within the refrigerator compartment. A power outage is considered to be the loss of normal power such as would occur when the AC power grid is lost, a circuit breaker trips, a fuse is blown, the refrigerator is unplugged, relative low line voltage condition or "brownout" or other event which disrupts AC power from being delivered to the refrigerator. Thus, when a power outage occurs, the DC damper 32 associated with the icebox is driven to a position of closed to ice box airflow and open to refrigerator airflow using battery power and fans associated with the evaporator and/or icebox provide for movement of cold air into the refrigeration compartment.

Figure 4:
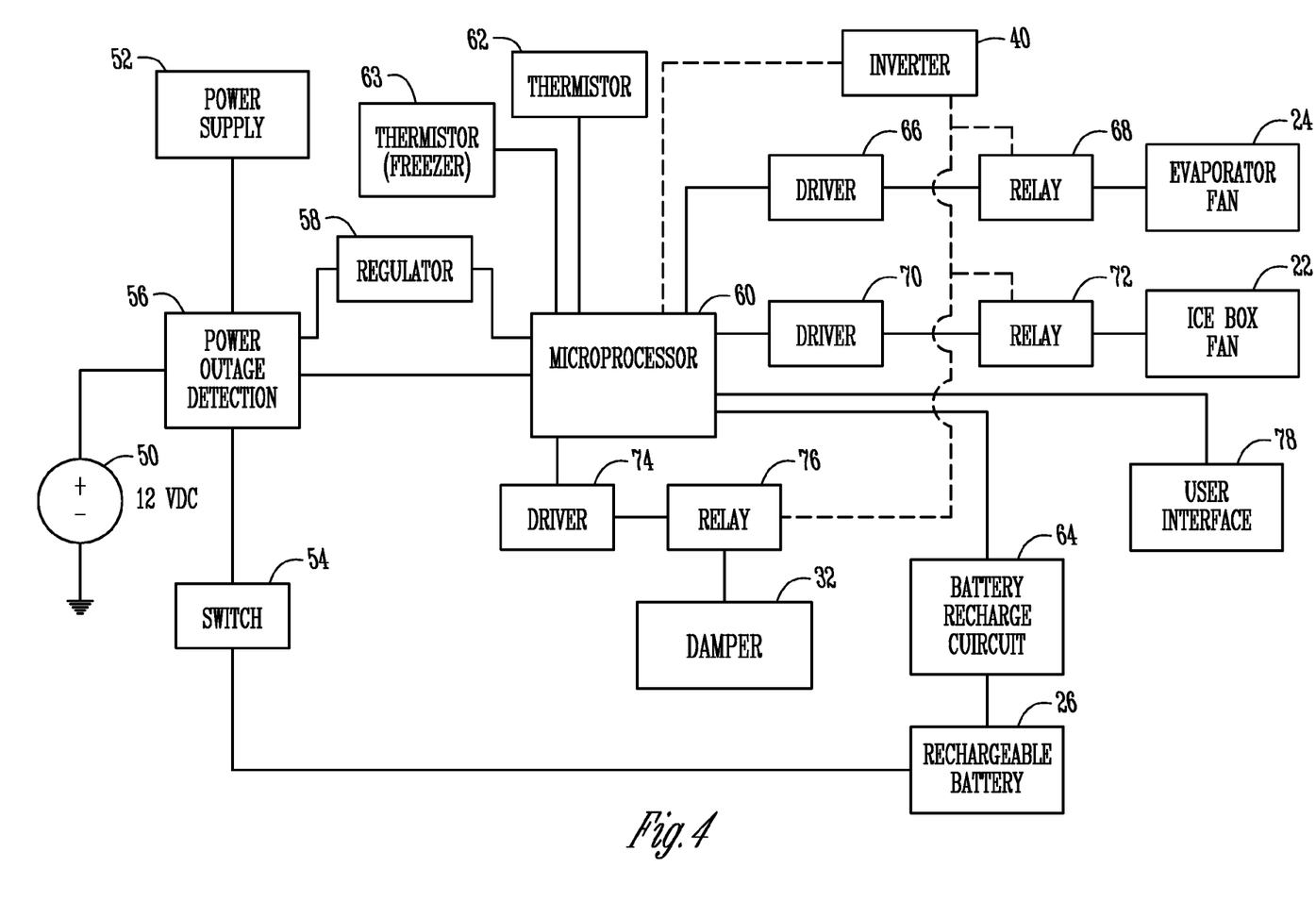
FIG. 4 is a detailed block diagram a control circuit with a low voltage dc power bus according to one embodiment of the present invention.

FIG. 4 is a detailed block diagram. One embodiment of a low voltage dc power bus 50 is shown which is electrically connected to a power outage detection circuit 56. The power outage detection circuit 56 is also electrically connected to the power supply 52 so that the power outage detection circuit 56 can determine when the power supply 52 is affected by a power outage. A switch 54 acts as a mechanical breaker which electrically connects to a rechargeable battery 26 so that the rechargeable battery 26 can be enabled or disabled by the user, thus turning on or off the extended cold feature. A regulator 58 is electrically connected to the power outage detection circuit and a microprocessor 60. The microprocessor 60 or other intelligent control device is electrically connected to the power outage detection circuit 56 so that the microprocessor senses a change in state of the low DC voltage power bus and thus a power outage or return of power. The microprocessor 60 is electrically connected through a driver and a relay to a DC damper. The microprocessor 60 is electrically connected through a driver 70 and relay 72 to a DC ice box fan 22. The microprocessor 60 is electrically connected through a driver 66 and relay 68 to a DC evaporator fan 24. The microprocessor 60 is electrically connected through a driver 74 and a relay 76 to a DC damper 32. The microprocessor 60 is also electrically connected to a user interface 78. The user interface 78 may be simple in nature, such as a single LED indicating that a power outage condition is being experienced, or alternatively, the user interface may be more complex and include a display indicating that a power outage condition is being experienced as well as current temperature in the refrigeration compartment 18 which may be determined by thermistor or other temperature sensor 62. In addition, a temperature sensor such as a thermistor 63 may be used to sense a temperature associated with the freezer compartment during the power outage. The microprocessor 60 may be programmed to record and indicate the length of the power outage, the estimated time before a setpoint is reached where food spoilage is likely to begin occurring, or other information associated with a power outage. The microprocessor 60 may also be programmed to turn off the extended cold feature in the event that the temperature within the freezer compartment reaches a predetermined turnoff point. Note that in FIG. 5, there is also an inverter 40 which may be used if the damper or fan uses alternating current as opposed to direct current.

Returning to FIG. 1, note that the user interface 78 can include one or more LEDs such as LED 17 as well as a display 19 which can be, but need not be a touchscreen display. The present invention contemplates that a consumer can interact with the user interface 78 in various ways. An LED 17 or the display 19 can indicate to the consumer that the refrigerator is currently operating in a power outage mode. In addition, the display 19 can indicate to a user the current temperature in the refrigeration compartment as well as an estimated amount of time before the refrigeration compartment reaches a critical temperature where food spoilage is likely to occur. Alternatively, the display 19 can indicate to a user an estimated amount of time that the refrigeration compartment will be able to maintain its current temperature. The user interface 78 also includes one or more buttons, switches, a touchscreen display, or other input so that the consumer may disable or enable the power outage mode. Also, an LED or display 19 of the user interface 78 may be used to indicate that the battery 26 should be replaced or that the battery is low.

In operation, the low voltage dc power bus 50 supplies power to the circuit. When the refrigerator is operating under normal power conditions, the battery recharge circuit recharges the rechargeable battery 26 to full capacity. Upon the occurrence of a power outage, the power outage detection circuit 56 determines that the power supply 52 is not supplying power and automatically switches to the rechargeable battery 26 instead of relying on the low voltage DC power bus 50. The microprocessor 60 senses a power outage has been detected. The microprocessor may be programmed to then open the DC damper 32 to allow cold air from the freezer compartment to reach the refrigerator compartment. The microprocessor may also turn on the DC evaporation fan 24 and the DC ice box fan 22 to assist in moving the cold air from the freezer compartment to the refrigerator compartment to thereby maintain the refrigeration compartment at a colder temperature than would otherwise occur during a power outage. The microprocessor may then also alert the user of the power outage or provide other information regarding the power outage through the user interface 78.

Figure 5:
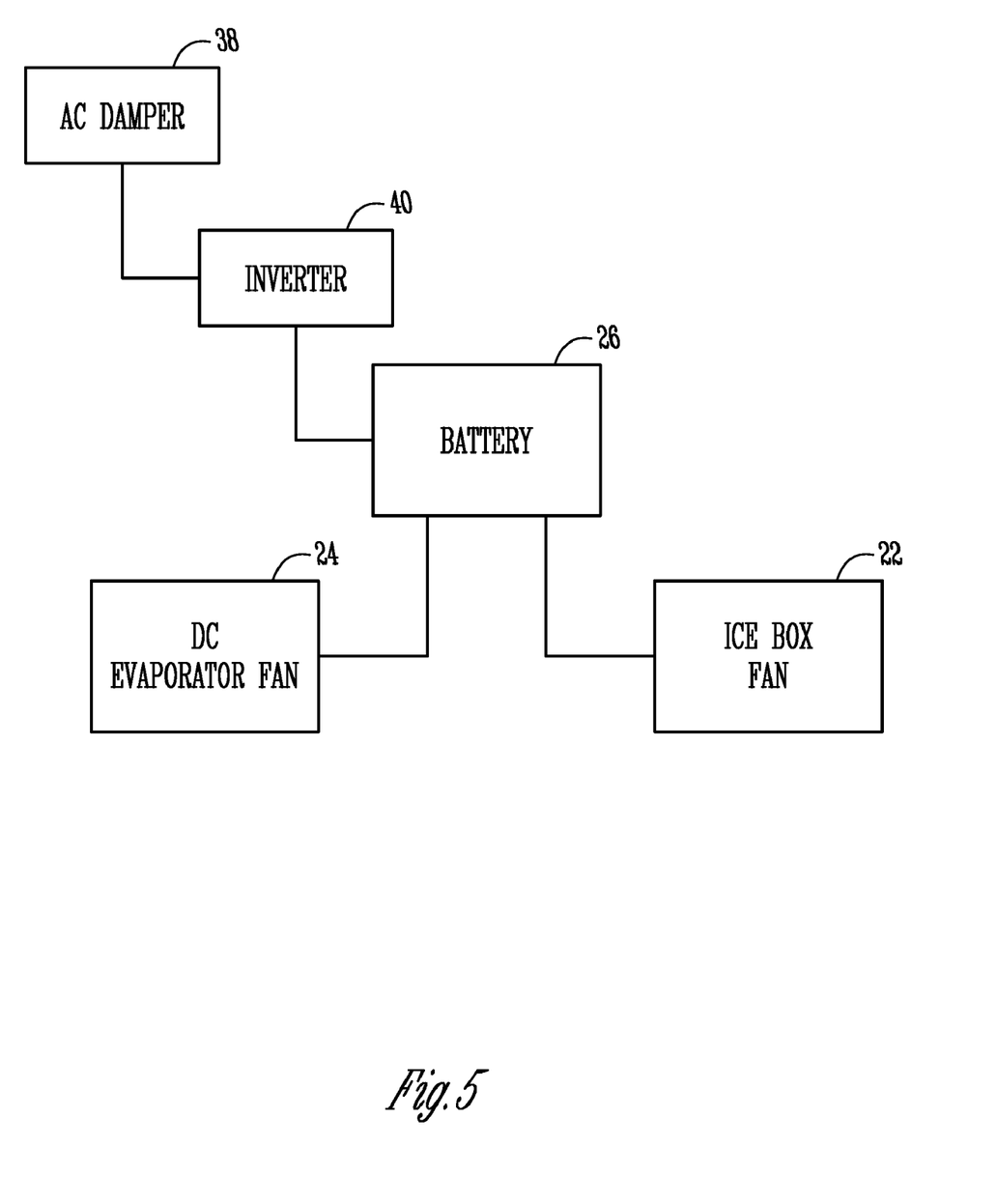
FIG. 5 is a block diagram of one embodiment of the present invention where an AC damper is powered by a battery using an inverter.
Figure 6:
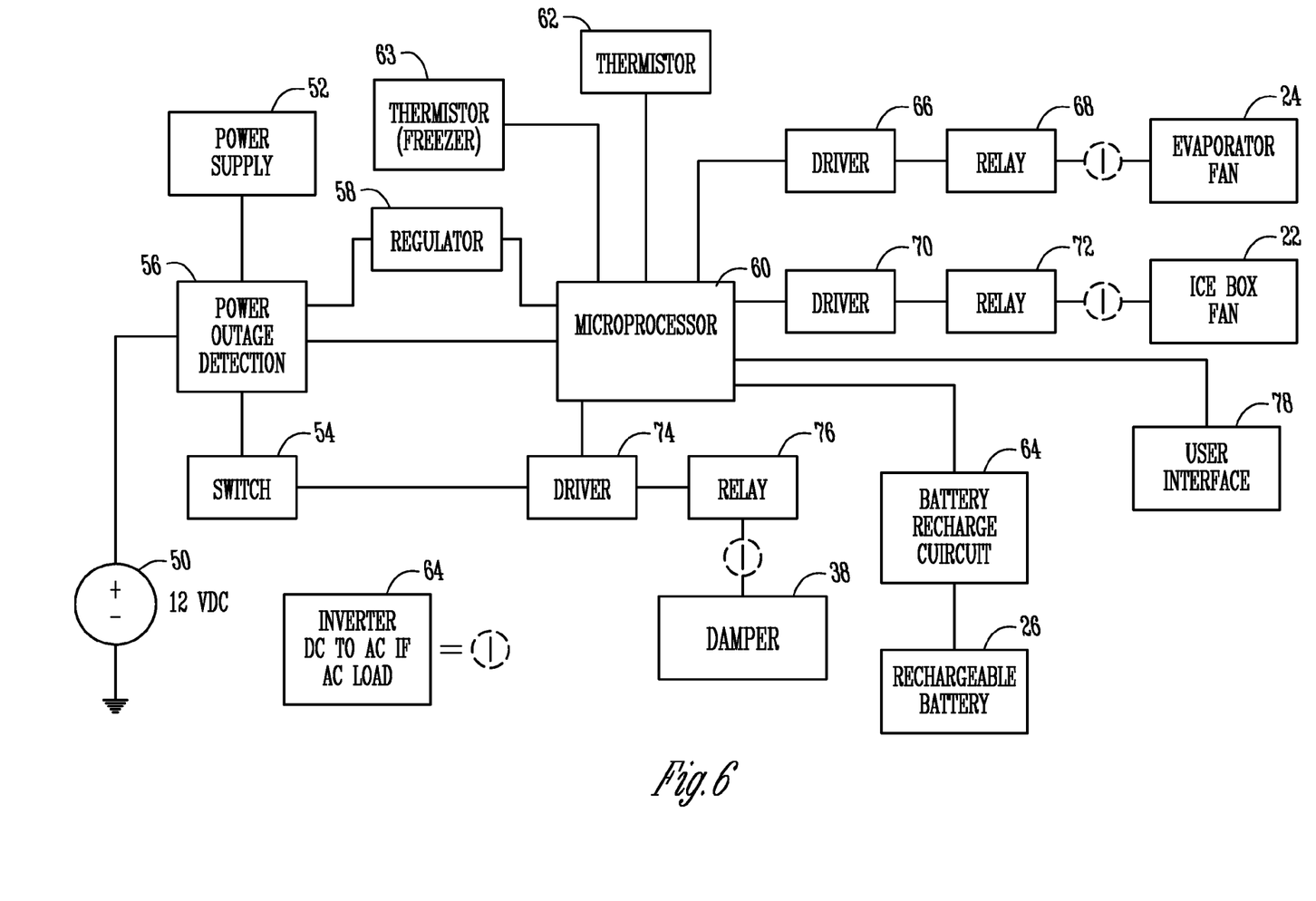
FIG. 6 is a detailed block diagram of one embodiment of the present invention where an AC dampers and AC loads may be powered by a battery using an inverter.

FIG. 5 illustrates another embodiment of the present invention. In FIG. 5, a battery 26 is electrically connected to a DC operated evaporator fan 24 and an ice box fan 22. The rechargeable battery 26 is also electrically connected to an inverter 40 which is electrically connected to an alternating current (AC) damper 38. The inverter allows the DC battery to be used to power the AC damper 38. FIG. 6 illustrates a detailed block diagram for an embodiment where either AC or DC dampers or fans may be used. Note that any one or more of the fans and/or the damper may, but need not use alternating current where an inverter is used.

It should be appreciated that the present invention contemplates numerous variations. According to one variation, the refrigerator is a side-by-side refrigerator with the refrigerator compartment and the freezer compartment positioned side-by-side instead of the freezer compartment being positioned under the refrigeration compartment. Alternatively, the refrigerator may be a top mount refrigerator where the freezer compartment is positioned above the refrigerator compartment. The present invention is not to be limited to a particular configuration of refrigerator. It is noted, however, that depending upon the type of configuration used, there may be other variations. For example, some configurations may not include an icebox fan where there is no icebox located remotely from the freezer compartment.

Figure 7:
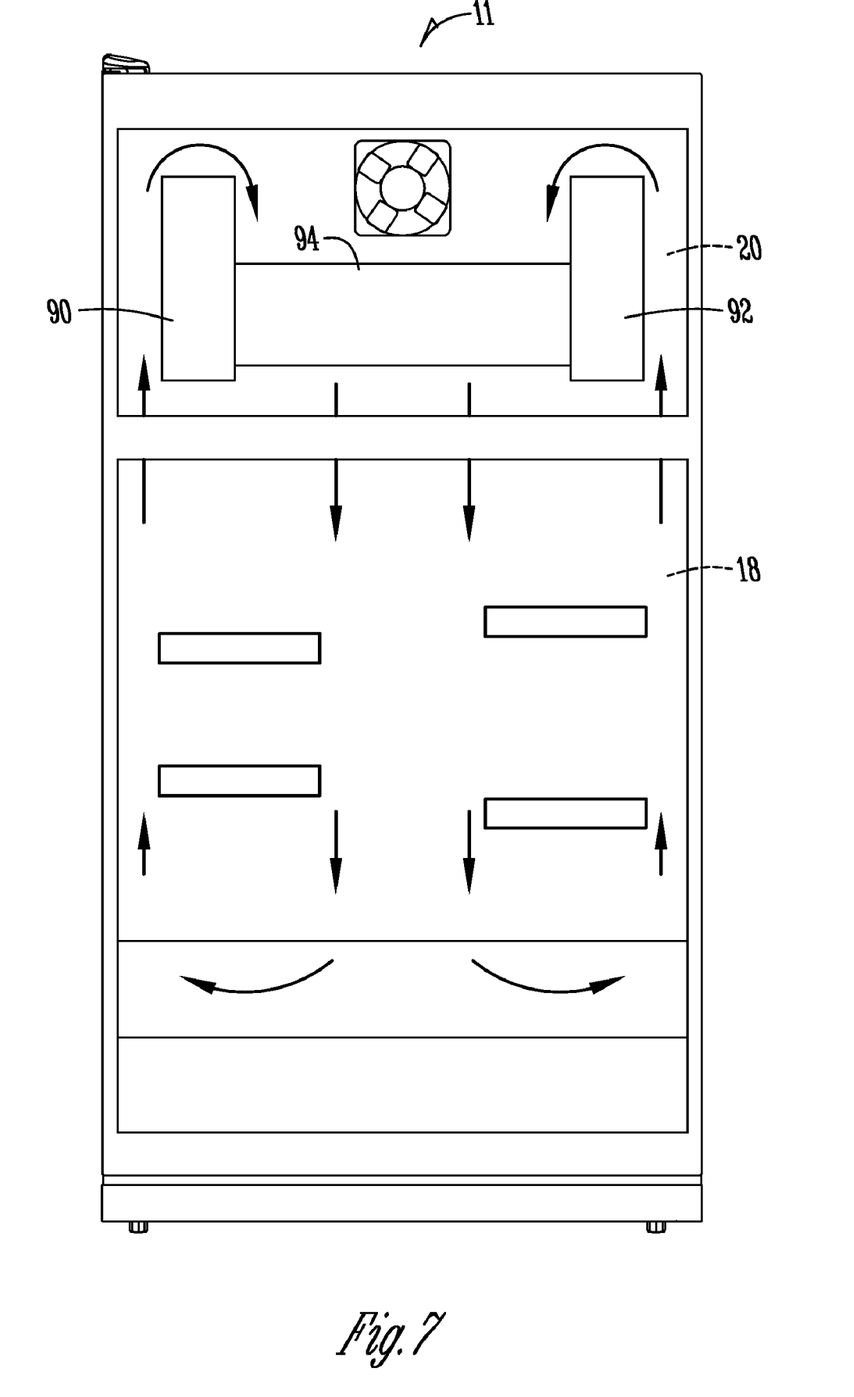
FIG. 7 is an inside view of one embodiment where thermal masses are used to prolong refrigeration in the event of a power outage.

FIG. 7 is a view of the interior of a refrigerator cabinet 11 with a refrigeration compartment 18 and a freezer compartment 20. In FIG. 7, thermal masses 90, 92 may be placed near the evaporator. The thermal masses 90, 92 may be containers of slow-thaw cooling gels such as a non-toxic substance known as "BLUE ICE" or may be of other types of depressed freeze point coolant. The presence of the thermal masses 90, 92 provides a cooling source in addition to any thermal loads that may already be present (frozen foods, for example). Thus, having the thermal masses present increases the amount of time that air from the freezer compartment 20 can be used to cool the refrigeration compartment 18.

Figure 8:
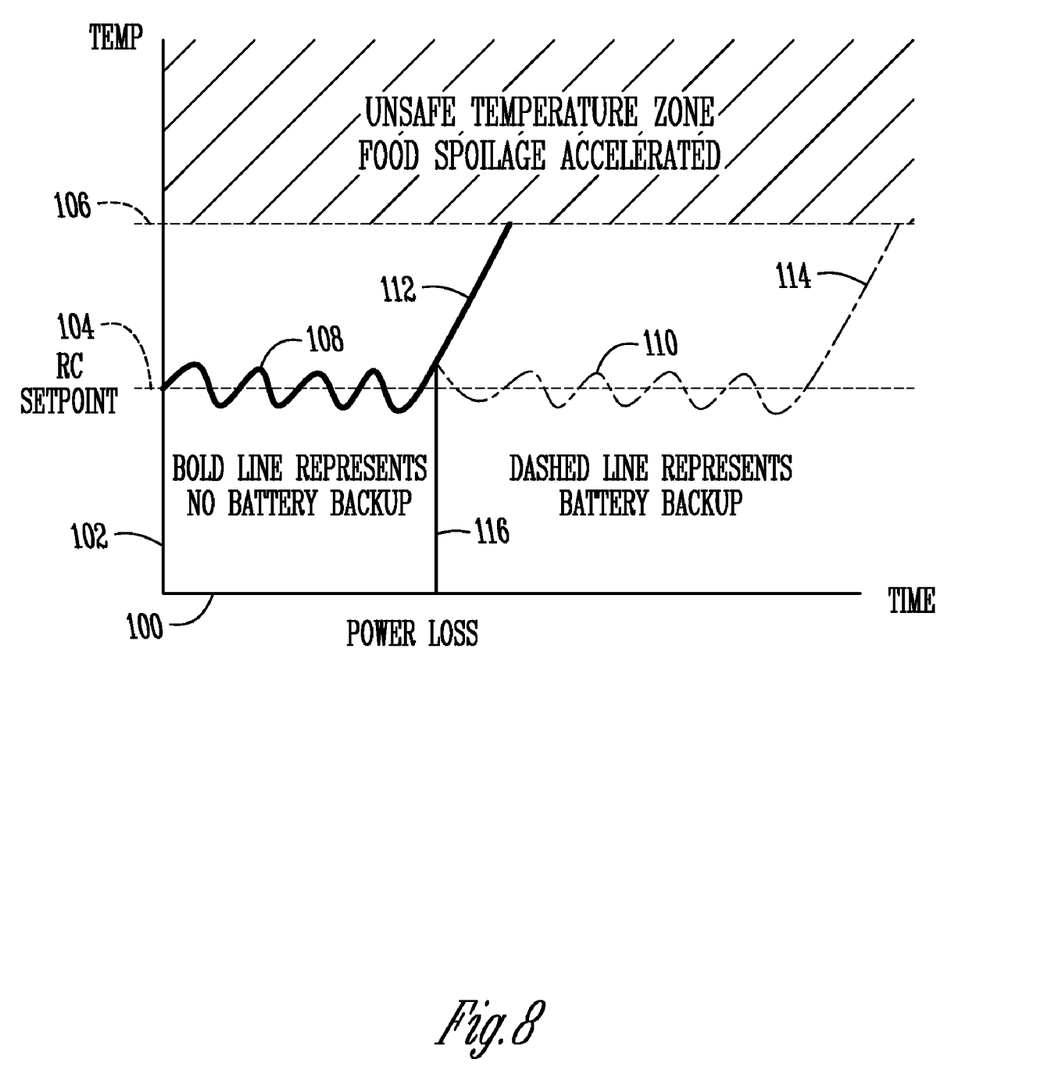
FIG. 8 is a graph illustrating the effect of the present invention on temperature within the refrigerating compartment according to one embodiment.

FIG. 8 illustrates advantages provided by the present invention. As shown in FIG. 8, there is a time axis 100 and a temperature axis 102. Along the temperature axis 102 is a refrigeration compartment setpoint 104 and a critical temperature 106 above which is considered an unsafe temperature zone and food spoilage is accelerated. In normal operation, the temperature 108 of the refrigeration compartment as shown with segment 108 stays within a small window associated with the setpoint 104. However, a power loss 116 may eventually occur. When a power loss occurs at a power outage time 116, the temperature of the refrigeration compartment with no battery backup begins to increase as indicated by the segment 112. With battery backup present, the segment 110 continues through time maintaining temperatures at or near the refrigeration compartment setpoint until eventually the temperature rises as indicated by segment 114 due to either loss of freezer cooling capacity or battery potential. Thus, as is shown in FIG. 8, the use of battery backup can extend the amount of time that a power outage can last without resulting in food spoilage in the refrigeration compartment.

Figure 9:
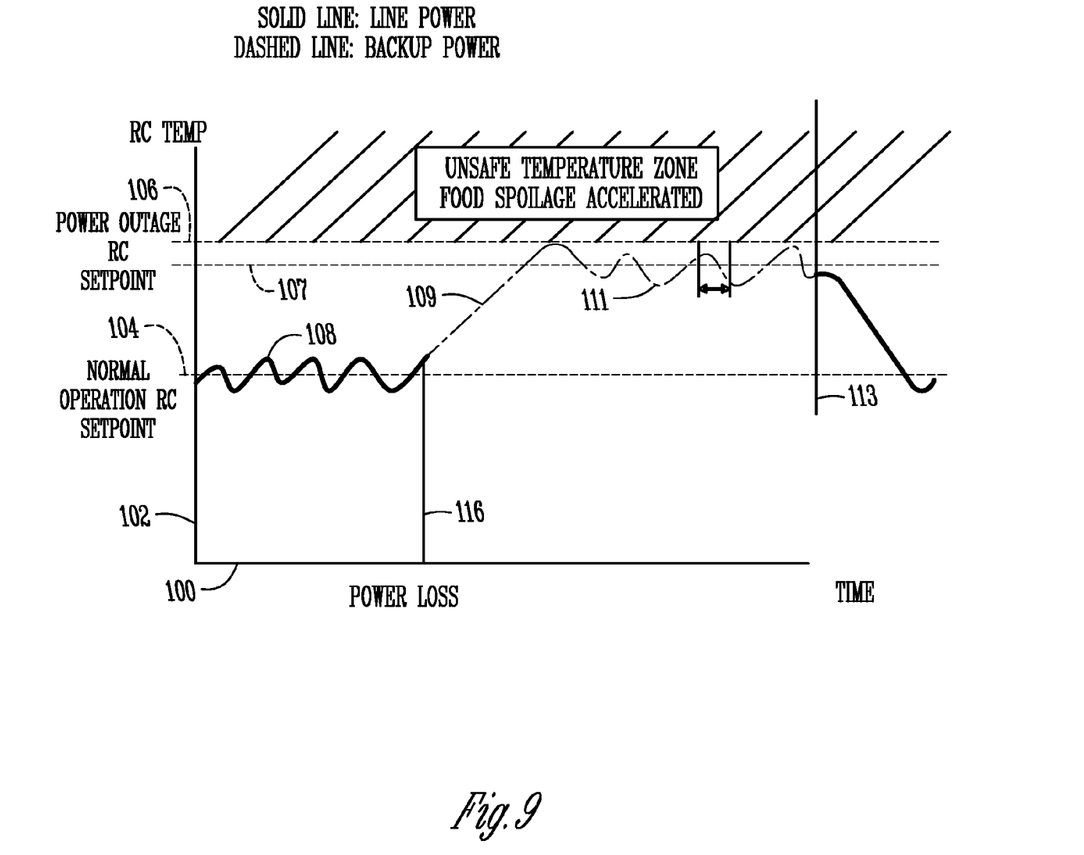
FIG. 9 is a graph illustrating the effect of the present invention on temperature within the refrigerating compartment according to another embodiment.

Similarly as shown in FIG. 9, a reduction in required battery capacity for the same duration of safe storage temperature condition can be obtained by allowing the refrigerator temperature to operate at a specific temperature set point (such as 39-40 degrees Fahrenheit) during a power outage. As shown in FIG. 9, there is a time axis 100 and a temperature axis 102. Along the temperature axis 102 is a refrigeration compartment setpoint 104 and a critical temperature 106 above which is considered an unsafe temperature zone and food spoilage is accelerated. In normal operation, the temperature of the refrigeration compartment as shown with segment 108 stays within a small window associated with the nominal operation setpoint 104. However, a power loss 116 may eventually occur. When a power loss occurs at a power outage time 116, the temperature of the refrigeration compartment is allowed to immediately increase as shown by segment 109 until the temperature is at or near the critical temperature 106. At that point, cooling cycles take place using one or more fans powered by the battery provided that there remains potential cooling capacity within the freezer compartment and there is remaining battery life. The cycles are shown along the segment 111. Then the grid power is restored at time 113. Thus, as is shown in FIG. 9, the use of battery backup can extend the amount of time that a power outage can last without resulting in food spoilage in the refrigeration compartment. The present invention contemplates that the power outage refrigeration compartment set point may be adjusted by the intelligent control. Having the power outage refrigeration compartment set point higher than the refrigeration compartment setpoint allows for a reduced required battery capacity to prevent food spoilage for a similar period of time.

Figure 10:
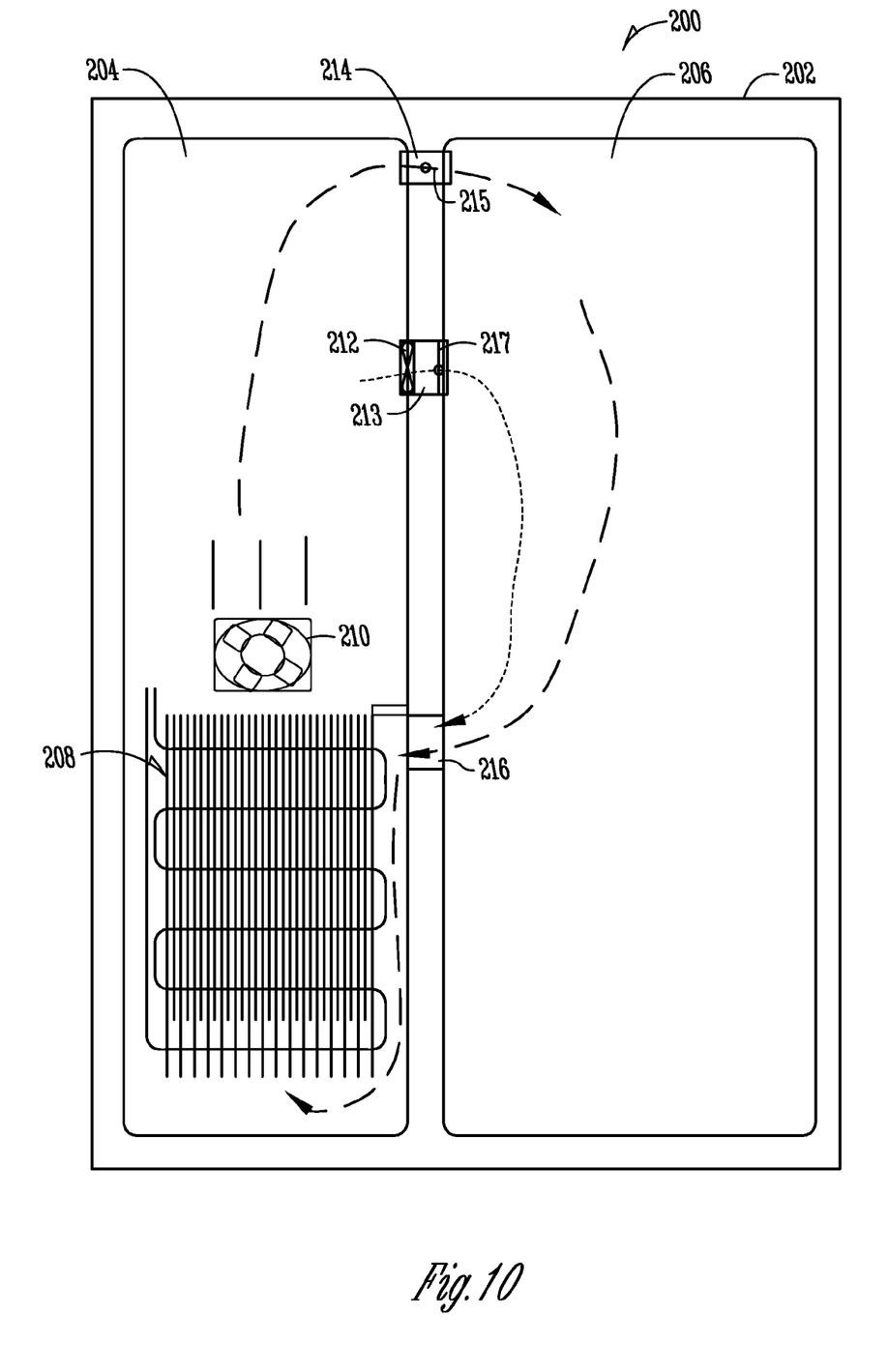
FIG. 10 is a view of a side-by-side refrigerator according to one embodiment of the present invention.

FIG. 10 is a schematic of a side freezer refrigerator (side-by-side) showing the implementation of a specific use fan that selectively operates during power outage conditions to provide airflow circulation between the refrigerator and freezer compartments. This fan may, but need not be used during normal operation to assist in temperature recovery. In FIG. 10, the refrigerator 200 has a refrigerator cabinet 202. A freezer compartment 204 and a refrigeration compartment 206 are disposed within the refrigerator cabinet 202. An evaporator 208 is shown proximate an evaporator fan 210. A damper 215 and a main supply duct 214 are shown. The damper 215 is open. A return duct 216 is also shown. In operation, cold air may be circulated through the duct 214, through the refrigeration compartment 206 and back through the return duct 216. An additional fan 212 may also be used to provide the extended cold feature. The additional fan 212 is shown in or near a duct 213 and there is also a damper 217 present. The damper 217 is shown in a closed position. The fan 212 and damper 217 may be operated by battery in the event of a power outage to control air flow from the freezer compartment 204 to the refrigeration compartment 206. The fan 212 and damper 217 may or may not be used in normal refrigeration operation.

What has been described herein is merely exemplary. The present invention contemplates numerous variations regarding the specific structures or methodologies used to implement the present invention. For example, the present invention contemplates that different configurations of refrigerators may be used such as, but not limited to, side-by-side configurations, bottom mount configurations, and top mount configurations; that the refrigerators may or may not include ice boxes located remotely from the freezer compartment; that where present, the user interface may of various types; and other variations and alternatives. The present invention is not to be limited to the specific disclosure provided herein.

What is claimed is:

1. A refrigerator, comprising:
a refrigerator cabinet;
a refrigerator compartment disposed within the refrigerator cabinet;
a freezer compartment disposed within the refrigerator cabinet;
a battery disposed within the refrigerator cabinet;
at least one fan disposed within the refrigerator cabinet and electrically connected to the battery;
wherein the battery provides power for the at least one fan during a power outage to thereby circulate air from the freezer compartment to the refrigerator compartment;
an intelligent control powered by the battery during the power outage and configured to control the at least one fan during the power outage to maintain temperature within the refrigerator compartment below a power outage refrigerator compartment set point, the power outage refrigerator compartment set point being higher than a normal operation refrigerator compartment set point;
a user interface comprising a display operatively connected to the intelligent control, the user interface powered by the battery during the power outage and adapted to provide information associated with the power outage to a user during the power outage on the display, the information comprising current temperature within the refrigerator compartment and an estimated amount of time before the refrigerator compartment reaches a critical temperature where food spoilage is likely to occur; and
wherein the user interface is operatively connected to a refrigerator compartment door providing access to the refrigerator compartment.

2. The refrigerator of claim 1 wherein the at least one fan includes a direct current operated fan.

3. The refrigerator of claim 1 further comprising an inverter and wherein the at least one fan includes an alternating current operated fan electrically connected to the inverter.

4. The refrigerator of claim 1 wherein the battery is a rechargeable battery.

5. The refrigerator of claim 4 further comprising a rechargeable battery recharging circuit electrically connected to rechargeable battery.

6. The refrigerator of claim 1 wherein the battery is selected from a set consisting of a non-rechargeable battery, a fuel cell, and a super capacitor.

7. The refrigerator of claim 1 wherein the battery comprises multiple cells or stages to allow for user configuration of backup power capacity.

8. The refrigerator of claim 1 wherein the battery is positioned external to the refrigerator cabinet.

9. The refrigerator of claim 1 further comprising at least one thermal mass disposed within the freezer compartment to thereby assist in maintaining cool air during the power outage.

10. The refrigerator of claim 9 wherein at least one of the at least one thermal mass having a thermal freeze point below a nominal freezer compartment storage temperature.

11. The refrigerator of claim 1 wherein the information includes duration a temperature within the refrigerator compartment is above a threshold temperature during the power outage.

12. The refrigerator of claim 1 wherein the information includes a maximum temperature measured within the refrigerator compartment during the power outage.

13. A refrigerator, comprising:
a refrigerator cabinet;
a refrigerator compartment disposed within the refrigerator cabinet;
a freezer compartment disposed within the refrigerator cabinet;
an ice box disposed within the refrigerator cabinet and remote from the freezer compartment;
a battery;
an ice box damper operatively connected to the battery for controlling air flow between the freezer compartment and the ice box;
an ice box fan proximate the ice box;
wherein the battery provides power for driving the ice box damper to a position of closed to ice box airflow and open to refrigerator compartment airflow and powering the ice box fan during a power outage to thereby circulate air from the freezer compartment to the refrigerator compartment;
a user interface comprising a display, the user interface powered by the battery during the power outage and adapted to provide information associated with the power outage to a user on the display during the power outage and after the power outage on the display, the information comprising current temperature within the refrigerator compartment and during the power outage an estimated amount of time before the refrigerator compartment reaches a critical temperature where food spoilage is likely to occur;

wherein the user interface is operatively connected to a door of the refrigerator.

14. The refrigerator of claim 13 wherein the ice box fan is a direct current operated ice box fan.

15. The refrigerator of claim 13 further comprising an inverter electrically connected to the battery and wherein the ice box fan is an alternating current operated icebox fan electrically connected to the inverter.

16. The refrigerator of claim 13 wherein the battery is disposed within the refrigerator cabinet.

17. The refrigerator of claim 13 wherein the ice box damper is a direct current damper.

18. The refrigerator of claim 13 further comprising an inverter electrically connected to the battery and wherein the ice box damper is an alternating current damper electrically connected to the inverter.

19. The refrigerator of claim 13 wherein the freezer compartment is above the refrigerator compartment.

20. The refrigerator of claim 13 wherein the freezer compartment is positioned side by side with the freezer compartment.

21. The refrigerator of claim 13 wherein the freezer compartment is below the refrigerator compartment.

22. The refrigerator of claim 13 wherein the ice box is within the refrigerator compartment.

23. The refrigerator of claim 13 wherein the battery is a rechargeable battery.

24. The refrigerator of claim 23 further comprising a rechargeable battery recharging circuit electrically connected to rechargeable battery.

25. The refrigerator of claim 13 further comprising at least one thermal mass disposed within the freezer compartment to thereby assist in maintaining cool air during the power outage.

26. The refrigerator of claim 25 wherein each of the at least one thermal mass having a thermal freeze point below a nominal freezer compartment storage temperature.

* * * * *